Oct. 12, 1954  A. P. CLAUSEN  2,691,538
JOINT CONSTRUCTION FOR BODY SHELLS
Filed March 3, 1951
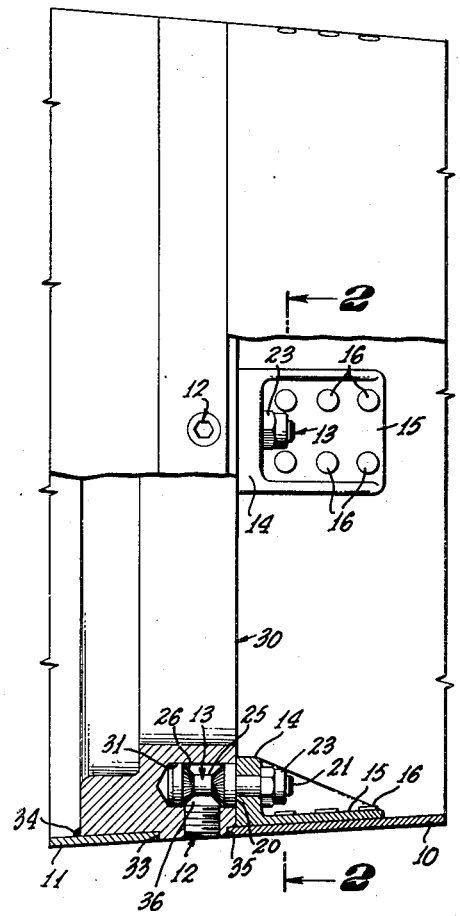
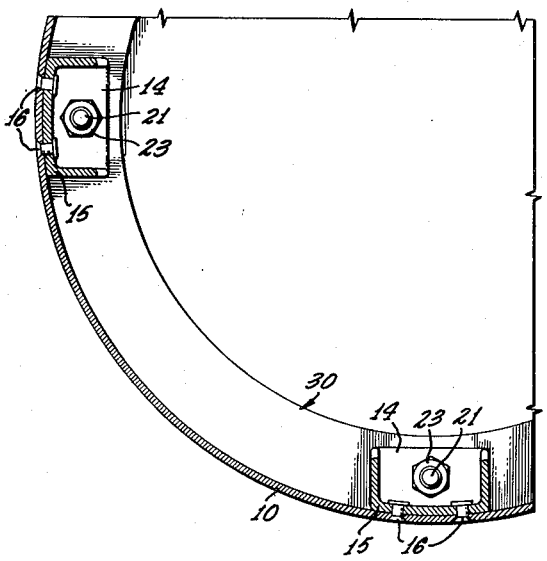
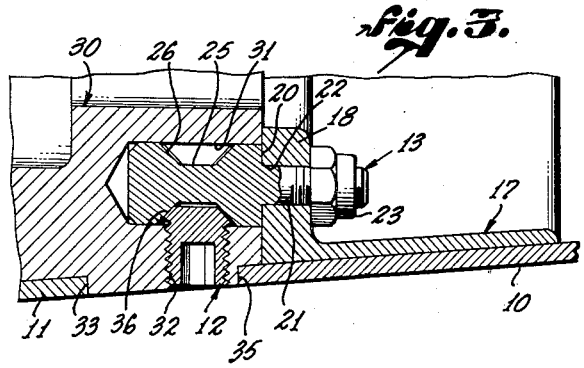
ALBERT P. CLAUSEN,
INVENTOR.
BY George V. Smyth
ATTORNEY.

Patented Oct. 12, 1954

2,691,538

UNITED STATES PATENT OFFICE 2,691,538

JOINT CONSTRUCTION FOR BODY SHELLS

Albert P. Clausen, Los Angeles, Calif.

Application March 3, 1951, Serial No. 213,727

4 Claims. (Cl. 285—168)

This invention relates to joint structures and refers particularly to junctures between body shells, such as the junctures between cylindrical tank sections.

In some instances where two body shells such as tank sections are to be joined together, it is of utmost importance that the joint not only be structural efficient, but also provide an assembly procedure that may be carried out rapidly without special skill and without need for specialized tools. Certain military situations, for example, call for assembly operations in the field where tank sections nested together for compactness in transit are shipped to a point of use for quick assembly by personnel on the spot.

Broadly described the present invention meets this requirement for joining body shells together end to end by providing a plurality of radially positioned set screws on one body shell for engagement with a shoulder on metal means extending longitudinally from the other body shell. While such a metal means may take various forms and may be made in one piece to provide the annular shoulder, it is preferably in the form of a plurality of longitudinally positioned studs mounted on a flange or ring inside the circumference of the body shell. The studs may be, and preferably are, formed with conical shoulders for engagement by the set screws so that tightening the set screws creates a cam action to draw the two body shells together in a manner that prevents any looseness or play at the joint.

An outstanding feature of the invention is the concept of providing the set screws with leading surfaces of broken configuration for biting into the metal means or studs in such manner as to resist retractive rotation of the set screws. The broken configuration provides cutting edges which may, if desired, be designed for greater resistance to retractive rotation than to advancing rotation of the set screws so that the screws may be tightened down with relatively great torque and thereafter require much greater reverse torque for release rotation. Thus the set screws in effect automatically lock themselves against release by biting into the metal means in a manner that discriminates against reverse rotation.

Discrimination against reverse or release rotation of the set screws may be achieved by inclining the cutting edges of the set screws in the rotary direction of retraction of the set screws so that a pronounced tendency of the cutting edges to dig into the impinging metal occurs whenever the set screws tend to retract. Discrimination may be further provided by forming the cutting edges to the configuration of curves that are swept back with respect to the direction of inward rotation of the screws. In the preferred practice of the invention the desired discrimination is furthered by both of these expedients.

A further feature of the preferred practice of the invention is in the use of set screws with tapered or conical leading ends to impinge against the inclined shoulders provided by the studs, thereby providing more extensive areas of "bite" than possible with screws having simple flat ends. This combination of a set screw with a conical leading end impinging against a conical shoulder on a longitudinal stud also provides a reverse action that desirably tends to tighten the associated stud as will be explained.

The various features and advantages of the invention will be apparent from the following detailed description taken with the accompanying drawings.

In the drawings, which are to be regarded as merely illustrative,

Figure 1 is a view partly in side elevation and partly in section showing two body shells united by the preferred form of joint construction;

Figure 2 is a transverse section taken on the line 2—2 of Figure 1;

Figure 3 is an enlarged sectional detail similar to the sectioned portion of Figure 2 showing a modified form of the joint construction; and Figure 4 is a face view on an enlarged scale of the leading end of one of the set screws.

In the presently preferred form of the invention exemplified by the drawings, two body shells 10 and 11 respectively of circular cross-sectional configuration are adapted to be joined together by set screws 12 carried by the shell 11 in engagement with longitudinal studs 13 carried by shell 10.

The studs 13 which are circumferentially spaced around the end of the shell 10 may be mounted on suitable flange means such as inner radial flanges 14 on the end of the shell 10. In the particular construction shown in Figures 1 and 2, the inner flanges 14 are provided by bracket members 15 that are mounted inside the shell 10 and attached thereto by suitable means such as rivets 16.

As shown in Figure 3, the plurality of bracket members 15 may, if desired, be replaced by a single ring generally designated 17, which ring has an inner radial flange 18 on which the studs 13 are mounted. Such a ring 17 has the advantage of reinforcing the shell 10.

Each stud 13 is formed with a shoulder 20 to abut the outer face of the flange 14 or 18 on which it is mounted and has a shank 21 of reduced diameter that extends through a suitable bore 22 in the flange. The end of the shank 21 of the stud is threaded to receive a suitable nut 23 that abuts against the inner face of the flange. The nut 23 is preferably of the shelf-locking type.

It is essential that the shoulder 20 of each stud 13 face towards the plane of juncture of the two shells 10 and 11, but the shoulder may be at an angle relative to the plane of juncture.

In the preferred construction shown, each stud 13 had a circumferential channel 25 with divergent sides, thus providing a conical shoulder 26 for engagement with the corresponding set screw 12 with the desired cam action for drawing the two shells together.

It is usually necessary to provide some kind of reinforcement around the end of the body shell 11 to provide the desired bore depth for seating the set screws 12. In the construction shown, the body shell 11 is provided with a ring, generally designated 30, positioned at the end of the shell. The ring 30 has circumferentially spaced openings or longitudinal bores 31 to receive the studs 13 and corresponding radial bores 32 intersecting the longitudinal bores. The radial bores 32 are threaded for threaded engagement by the set screws 12.

While the ring 30 may be entirely enclosed by the shell 11, the ring is of the same diameter as the shell in the present construction to serve in effect as an extension of the shell and is cut away as indicated at 33 to receive the end margin of the shell, the shell being welded to the ring as shown at 34. The ring 30 is also cut away as shown at 35 to provide a seat for the end margin of the shell 11.

Each set screw 12 impinges on the inclined or conical shoulder 26 of the corresponding stud 13 and preferably does so with a cam action tending to tighten the joint between the two body shells. In the preferred construction shown, the leading end of each set screw 12 is beveled to some degree to provide a conical surface 36 to match the depth and inclination of the conical shoulder 26 of the stud.

Thus the leading surface of each set screw 12 includes the conical surface 36 as well as the flat end surface and at least the conical surface is of broken configuration to provide the desired biting action. It is to be understood that the set screws 12 are harder than the studs 13 and may be tempered or case hardened for this purpose.

In the preferred form of set screw, as best shown in Figure 4, the conical surface 36 is fluted to provide cutting edges 37 that extend outward to the periphery of the set screw. Preferably, the cutting edges 37 are shaped like ratchet teeth to favor advancing rotation of the set screw, but to resist reverse rotation. In other words, the cutting edges 37 are pointed or inclined towards the direction of reverse or retractive rotation of the set screw so that any such reverse rotation tends to dig the teeth into the metal of the coacting stud 13. Thus, when a set screw is tightened with sufficiently great force to cause the set screw to bite into the associated stud, even greater force is required for reverse rotation to loosen the set screw.

It may also be observed in Figure 4 that the teeth 37 conform to curves that are swept back with respect to the direction of advancing rotation of the set screw. The direction of advancing rotation or tightening rotation of the set screw is indicated by the arrow 38.

The previously mentioned reverse action that desirably tends to tighten a stud 13 may be understood by considering Figure 3. Since the set screw 12 has a right hand screw thread, any loosening or release rotation of the set screw is counterclockwise as viewed from the outer end of the set screw or as viewed from below in Figure 3. Now, since the cam pressure of the conical nose of the set screw against the conical surface 26 of the corresponding stud 13 tends to rotate the stud, just as two meshed beveled gears tend to rotate each other, any loosening rotation of the set screw tends to cause left hand or counterclockwise rotation of the stud as viewed from the end carrying the nut 23. Thus any rotation transmitted to the stud 13 by release rotation of the set screw is in the direction to tighten the nut.

It is recognized, of course, that, conversely, tightening of the set screw is in a direction to loosen the stud from the nut, but the inclination of the cutting teeth 37 is in the rotary direction to minimize the transmission of motion to the stud in the course of tightening the set screw and in practice no such tendency is evident.

The manner in which the described invention is operated and used may be readily understood from the foregoing description. The body shells 10 and 11 may be shipped separately to a point of assembly and if, as here indicated, the shells are somewhat conical in configuration, they may be nested for compactness in transit, so that a great number of dismantled body shells may be shipped in a given volume of cargo space. The set screws 12 and the studs 13 together with the nuts 23 will also usually be shipped separately.

At the point of use it is a simple matter to install the studs 13 and then move the two body shells 10 and 11 together in end to end relationship with the studs 13 extending into the corresponding longitudinal bores 31 in the ring 30. The set screws 12 are then inserted to tighten the joint between the two body shells by cam action and finally the set screws are tightened down to cause the cutting edges 37 to bite effectively into the impinging metal of the studs 13.

Thereafter the resistance to reverse rotation of the set screws 12 by virtue of the gouging engagement of the cutting edges 37 with the softer metal of the studs effectively prevents reverse rotation of the set screws. The biting engagement of the cutting edges of the set screws with the studs precludes any accidental loosening of the set screws even though the structure be subjected to impacts and excessive vibration over long periods of time.

The preferred embodiment of the invention described in detail herein, by way of example and to illustrate the principles involved, will suggest to those skilled in the art various changes, modifications, and other departures from the disclosure that properly lie within the spirit and scope of the appended claims.

I claim:

1. In a structure of the character described: a first body shell and a second body shell; radial flange means mounted inside said first shell at the one end thereof; a ring mounted inside said second shell near one end thereof and adapted to facewisely engage with said flange means when the shells are assembled end-to-end, said ring having circumferentially spaced openings facing said flange means and having a peripheral bore open to the exterior of said second shell and communicating with each of said openings intermediate the ends thereof; a plurality of studs equal in number to said spaced openings spacedly mounted on said flange means to project therefrom in such relationship that a stud extends into and substantially fills each of said openings as said shells are assembled, each stud formed with an annular groove defining at least one annular shoulder inclined to face said flange means; and set screws threaded into said bores for reception in the grooves of the studs, said set screws being of harder material than said studs and having the inner ends formed with surfaces of broken configuration to bite into said shoulders for anchorage against accidental rotary retraction to thereby hold said studs against separation from said ring whereby said shells are held assembled.

2. A combination as set forth in claim 1 in which said leading surfaces of the set screws are at least in part conical for engaging said inclined shoulder with a cam action to draw the two shells together.

3. A combination as set forth in claim 1 in which the inner ends of said set screws are conical in configuration for engaging the inclined shoulders of the studs to cam the studs inwardly of the openings to draw the two shells together, and in which the surfaces of said inner ends are serrated to provide cutting teeth formed to resist rotation of said set screws in the direction of rotary retraction.

4. A combination as set forth in claim 3 in which said studs are secured on said flange means by means including screw threads and by virtue of contact with the conical shoulders of the studs on the part of the set screws, rotation of the set screws in the direction of retraction tends to rotate said studs in directions to tighten the studs with respect to said screw threads.

References Cited in the file of this patent

UNITED STATES PATENTS

| Number | Name | Date |
|---|---|---|
| 955,556 | Schade | Apr. 19, 1910 |
| 1,039,058 | Hoeffel | Sept. 17, 1912 |
| 2,300,259 | Kueppers | Oct. 27, 1942 |
| 2,371,801 | Chester et al. | Mar. 20, 1945 |
| 2,442,184 | Summers | May 25, 1948 |

FOREIGN PATENTS

| Number | Country | Date |
|---|---|---|
| 203,508 | Great Britain | Sept. 13, 1923 |
| 333,950 | Italy | Jan. 17, 1936 |
| 516,856 | Great Britain | Jan. 12, 1940 |